United States Patent [19]
Ogasawara et al.

[11] Patent Number: 5,910,980
[45] Date of Patent: Jun. 8, 1999

[54] CALLING SUBSCRIBER INFORMATION NOTIFICATION

[75] Inventors: Hajime Ogasawara; Yoshihiro Kaneko, both of Kawasaki, Japan

[73] Assignee: Fujitsu Limited, Kanagawa, Japan

[21] Appl. No.: 08/839,910

[22] Filed: Apr. 21, 1997

[30] Foreign Application Priority Data

Jun. 5, 1996 [JP] Japan ................................ 8-142594

[51] Int. Cl.⁶ ................................................ H04M 3/42
[52] U.S. Cl. .......................................... 379/142; 379/93.26
[58] Field of Search .................................. 379/142, 201, 379/215, 230, 93.26, 93.28; 370/466, 467

[56] References Cited

U.S. PATENT DOCUMENTS

| | | | |
|---|---|---|---|
| 5,479,493 | 12/1995 | Baker et al. | 379/142 |
| 5,655,001 | 8/1997 | Cline et al. | 370/467 |
| 5,703,936 | 12/1997 | Tsuchida et al. | 379/142 |

FOREIGN PATENT DOCUMENTS

| | | |
|---|---|---|
| 62-269463 | 11/1987 | Japan . |
| 2-70161 | 3/1990 | Japan . |
| 5-145638 | 6/1993 | Japan . |

OTHER PUBLICATIONS

Tony Goss, Nortel Successfully Demonstrates ETsI V5.2 CAll . . . , Nortel New Releases, Jul. 1996.

*Primary Examiner*—Paul Loomis
*Attorney, Agent, or Firm*—Helfgott & Karas, PC.

[57] ABSTRACT

Information, such as a calling subscriber number, is furnished to a called subscriber, regardless of the type of subscriber terminal that is accommodated by an access network, which is provided independent of a local exchange, and regardless of whether a connection is a wireless connection or a wire connection. A calling subscriber information notification system includes a local exchange, and an access network, located independent of the local exchange, for accommodating a plurality of subscriber terminals. When a call is made by one of the subscriber terminals, the access network receives, from the local exchange, a signal message including information concerning a calling subscriber terminal, and when a called subscriber has been registered for a called number notification service sends to the called subscriber, the information concerning the calling subscriber terminal that has been received from the local exchange.

7 Claims, 15 Drawing Sheets

Communication Channel

Fig. 10

| Layer 3 Protocol | | Message | Usage |
|---|---|---|---|
| PSTN Signalling | | ESTABLISH | Request Originating or Terminating Path |
| | | ESTABLISH ACK | Acknowledge ESTABLISH |
| | | SIGNAL | Convey PSTN line conditions |
| | | SIGANL ACK | Acknowledge SIGNAL |
| | | STATUS | Indicate the status of AN |
| | | STATUS ENQUIRY | Request the status of AN |
| | | DISCONNECT | Indicate to release the path |
| | | DISCONNECT COMPLETE | Acknowledge DISCOUNT |
| | | PROTOCOL PARAMETER | Change a protocol parameter in AN |
| Control | Port | PORT CONTROL | Convey ISDN/PSTN use port Control-function-element information element |
| | | PORT CONTROL ACK | Acknowledge PORT CONTROL |
| | Common | COMMON CONTROL | Convey Information of Interface Control |
| | | COMMON CONTROL ACK | Acknowledge COMMON CONTROL |

| 8 | 7 | 6 | 5 | 4 | 3 | 2 | 1 | Octet |
|---|---|---|---|---|---|---|---|---|
| 0 | 1 | 1 | 1 | 1 | 1 | 1 | 1 | 1 |
| Length CLI-information content | | | | | | | | 2 |
| month(M1) | | | | month(M2) | | | | 3 |
| day(D1) | | | | day(D2) | | | | 4 |
| hour(h1) | | | | hour(h2) | | | | 5 |
| minutes(m1) | | | | minutes(m2) | | | | 6 |
| Number of digits of calling DN | | | | | | | | 7 |
| 2nd digit | | | | 1st digit | | | | 8 |
| 4th digit | | | | 3rd digit | | | | |
| | | | | | | | | |
| Filler(if necessary) | | | | nth digit | | | | m-1 |
| Number of charactors of calling name | | | | | | | | m |
| 1st charactor | | | | | | | | |
| 2nd charactor | | | | | | | | |
| | | | | | | | | |
| n-th charactor | | | | | | | | n |

Fig. 12

| Bits | Description |
|---|---|
| 0 1 1 1 1 1 1 1 | Information element Identifier |
| 0 0 0 1 0 1 0 0 | Length (20) |
| 0 0 0 1 0 0 1 0 | Month (12) |
| 0 0 0 1 1 0 0 1 | Date (19) |
| 0 0 0 1 0 0 0 0 | Time (10) |
| 0 0 1 1 0 0 0 0 | Minute (30) |
| 0 0 0 0 0 1 0 1 | Length (5) |
| 0 0 0 0 0 1 0 0 | 04 ⎫ |
| 0 1 0 0 0 1 1 1 | 47 ⎪ |
| 0 1 0 1 0 0 1 0 | 52 ⎬ Telephone Number |
| 0 1 0 0 0 0 0 0 | 40 ⎪ |
| 0 1 0 1 0 0 0 1 | 51 ⎭ |
| 0 0 0 0 1 0 0 1 | Length (9) |
| 0 1 0 0 1 1 1 1 | O ⎫ |
| 0 1 0 0 0 1 1 1 | G ⎪ |
| 0 1 0 0 0 0 0 1 | A ⎪ |
| 0 1 0 1 0 0 1 1 | S ⎪ |
| 0 1 0 0 0 0 0 1 | A ⎬ Name |
| 0 1 0 1 0 1 1 1 | W ⎪ |
| 0 1 0 0 0 0 0 1 | A ⎪ |
| 0 1 0 1 0 0 1 0 | R ⎪ |
| 0 1 0 0 0 0 0 1 | A ⎭ |

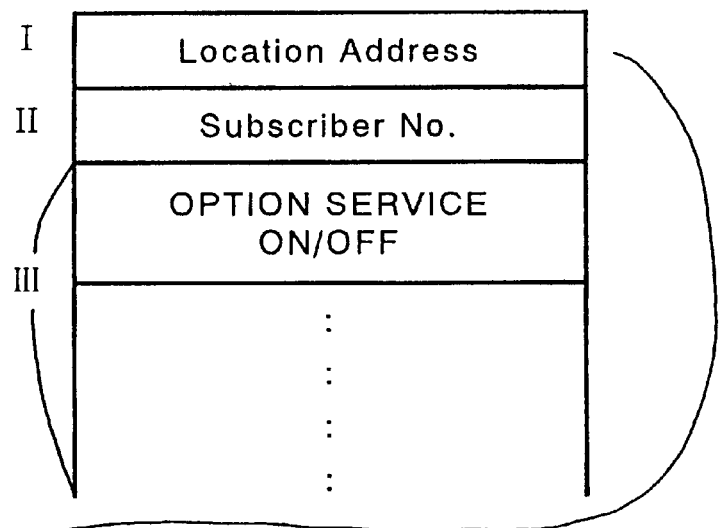
Fig. 13A
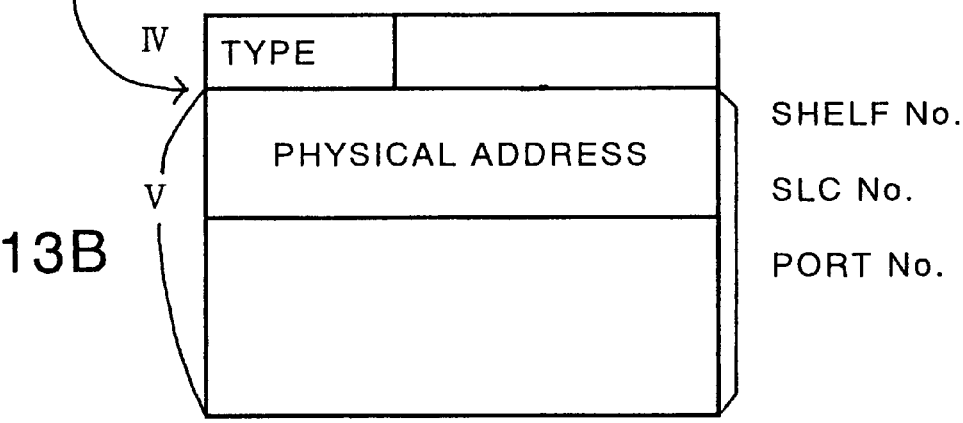
Fig. 13B
Fig. 13C
TYPE
0 0 0 : SLC (Analog)
0 0 1 : DLC (ISDN)
0 1 0 : AN-1 (wired)
0 1 1 : AN-2 (wireless)

Fig. 15

| Information element | | Reference | Direction | Type | Length |
|---|---|---|---|---|---|
| Protocol discriminator | | 10.2 | both | MF | 2 |
| Transaction identifier | | 10.3 | both | MF | |
| Message type | | 10.4 | both | MF | |
| Repeat indicator | 1) | 10.5.4.16 | both | OF | 1 |
| Bearer capabilities | 2) | 10.5.4.4 | both | OV | 3-11 |
| Mobile identity | 3) | 10.5.1.4 | ms -> n | OV | 2-10 |
| Facility | 4) | Rec. GSM 04.10 | both | OV | 2-? |
| Progress indicator | 5) | 10.5.4.15 | n -> ms | OV | 4 |
| Signal | 6) | 10.5.4.17 | n -> ms | OF | 2 |
| Calling party BCD number | 7) | 10.5.4.7 | n -> ms | OV | 2-14 |
| Calling party sub-address | 7a) | 10.5.4.7a | both | OV | 2-23 |
| Called party BCD number | 8) | 10.5.4.6 | both | OV | 2-13 |
| Called party sub-address | 8a) | 10.5.4.6a | both | OV | 2-23 |
| Repeat indicator | 9) | 10.5.4.16 | both | OF | 1 |
| Low layer compatibility | 10) | 10.5.4.12 | both | OV | 3-15 |
| Repeat indicator | 11) | 10.5.4.16 | both | OV | 1 |
| High layer compatibility | 12) | 10.5.4.10 | both | OV | 4-5 |
| User-user | 13) | 10.5.4.18 | both | OV | 2-35 | a⇒ (at Calling party BCD number)
b⇒ (at Called party BCD number)

CALLING SUBSCRIBER INFORMATION NOTIFICATION

BACKGROUND OF THE INVENTION

1. Field of the Invention

The present invention relates to a service system for transmitting information about a calling subscriber to a called subscriber terminal that is accommodated in an access network.

2. Related Arts

In a switch system, a service for transmitting the phone number, etc., of a calling subscriber to a called subscriber has been standardized, when the service is provided using ISDN. Also proposed for an analog subscriber is a function to notify a called subscriber of the phone number of a calling subscriber, between call rings, that would be included in a subscriber circuit.

Although the function of the access network was with a local exchange, since there are a variety of subscriber terminals and since there is a long distance between a subscriber terminal and a local exchange, it has been proposed that the access network be established independent of the local exchange. In this case, an interface would be required for communication between an independent access network and a local exchange, and an interface (V5) is being adopted as a standard for this purpose.

The standard interface (V5) is specified by the ETSI in Europe, and further, has been designated as the international standard by the International Telecommunication Union (ITU).

In addition the standard interface (V5) is advantageous in that a network user (PTT) can reduce a selection range for an access network and the time required for building a network, because the interface between the local exchange and the access network, by which subscriber terminals are accommodated, is standardized.

The network user (PTT), therefore, voluntarily adopts the standard interface (V5). In this case, however, no provision is made for the acceptance of a service for notifying a called subscriber of the phone number of a calling subscriber, so that a called subscriber can not avail him or herself of the caller phone number service.

Recently, wireless terminals, such as a portable telephones, have been popular as subscriber terminals. When a wireless terminal is to be accommodated by an access network, the interface function for the wireless terminal has a different configuration than that interface function that is used with a wire connection for accommodating a subscriber terminal on the access network.

Therefore, conventionally, the protocol that is employed differs depending on whether a subscriber terminal accommodated by the access network is an analog subscriber terminal or is an ISDN terminal, and whether the access network and the subscriber terminal are connected by wire or by wireless.

In particular, the protocol is undetermined that is to be used when the subscriber terminal that is accommodated by the access network is an analog subscriber terminal that is connected to the access network by wireless.

SUMMARY OF THE INVENTION

It is, therefore, one object of the present invention to provide a calling subscriber information notification system that can furnish a called subscriber certain information concerning a calling subscriber, such as his or her phone number, regardless of types of a subscriber terminals accommodated by an access network that is provided independently of a local exchange, and regardless of whether a connection is accomplished by wireless or by wire.

It is another object of the present invention to provide a calling subscriber information notification system that furnishes a called subscriber, accommodated by an access network, not only a subscriber number of a calling subscriber, but also information concerning the date and the time of a call and the name of the calling subscriber.

It is an additional object of the present invention to provide a calling subscriber information notification system that can transmit information concerning a calling subscriber, such as his or her phone number, to a called subscriber at a wireless subscriber terminal, which is accommodated by an access network that is connected to a local exchange via a standard interface (V5), as well as to a called subscriber at a wired subscriber terminal.

The other objects of the present invention will become apparent in due course during the detailed description of the embodiment of the present invention, which will be given while referring to the accompanying drawings.

BRIEF DESCRIPTION OF THE DRAWINGS

FIG. 10 is a diagram showing example message types having the format structure in FIG. 9;

FIG. 11 is a diagram showing the detailed structure of the CLI information format in FIG. 9;

FIG. 12 is a diagram showing the contents of an example CLO information format;

FIGS. 13A through 13C are diagrams for explaining a subscriber management table;

FIG. 15 is a diagram showing example messages when calling subscriber information is to be transmitted to a wireless terminal.

DETAILED DESCRIPTION OF THE PREFERRED EMBODIMENT

Figure 1:
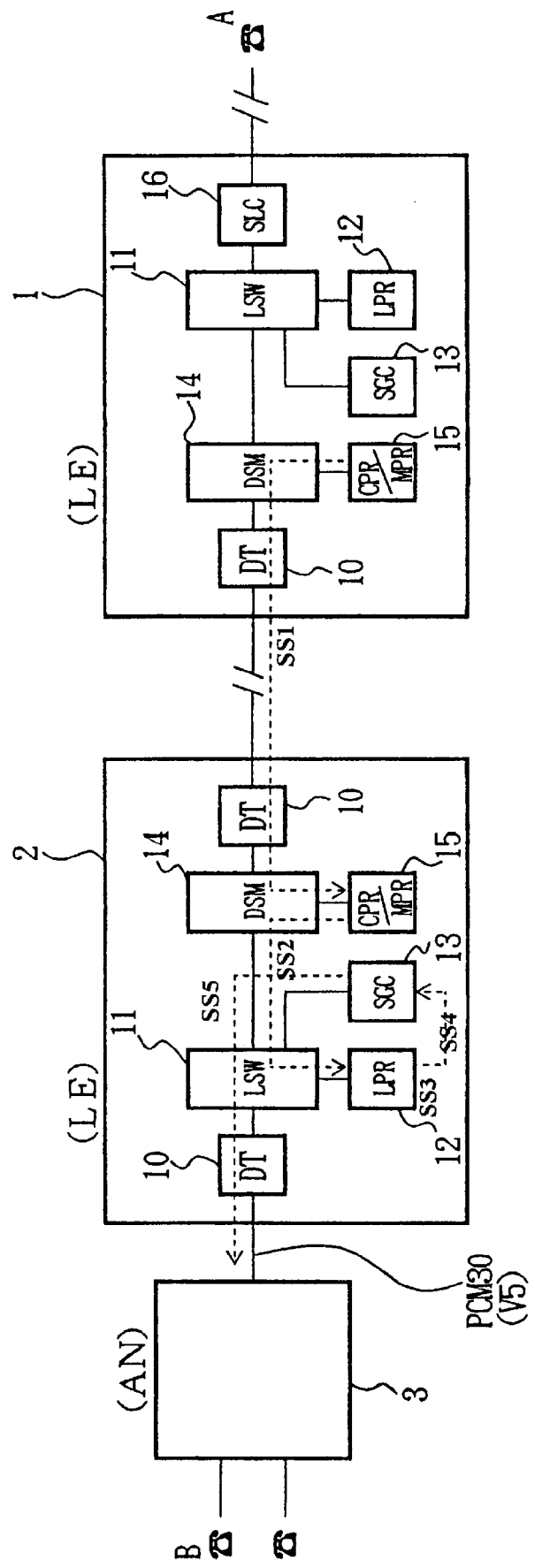
FIG. 1 is a block diagram illustrating an example application of the present invention.

The preferred embodiment of the present invention will now be described while referring to the accompanying drawings. The same reference numerals or symbols are used throughout to denote corresponding or identical components in the drawings.

FIG. 1 is a block diagram illustrating a calling subscriber information notification system according to one embodiment of the present invention. In FIG. 1, conventional ISDN local exchanges 1 and 2 are connected via a line, and a plurality of subscribers are accommodated by the local exchange 1 via a subscriber line card (SLC) 16. In the embodiment shown in FIG. 1, a calling subscriber A is accommodated by the local exchange 1 via the subscriber line card (SLC) 16, and an access network 3 by which a called subscriber B is accommodated is connected to the local exchange 2.

While using an information format that conforms to the public switched telephone network (PSTN) protocol, as will be described later while referring to FIG. 8, the information concerning the calling subscriber A is transmitted from a block 15, composed of a call processor (CPR) and a main processor (MPR) (hereinafter referred to simply as the CPR/MPR 15), at the local exchange 1 through a digital switch module (DSM) 14 and a digital terminal (DT) 10 at the local exchange 1, and through a digital terminal (DT) 10 and a digital switch module (DSM) 14 at the local exchange 2 to a CPR/MPR 15 at the local exchange 2 (step SS1).

The CPR/MPR 15 of the local exchange 2 transmits the received information via a line switch (LSW) 11 to a succeeding line processor (LPR) 12 (step SS2).

The line processor 12 of the local exchange 2 reads data for a called subscriber, which will be described later while referring to FIGS. 13A through 13C, from a subscriber management table that is stored in a memory (not shown) that is attached to the line processor 12. Then, the line processor 12 processes the received information so that it can be transmitted via a standard interface V5 from the local exchange 2 to the access network (step SS3).

The processed information is transmitted as a signal message to a signaling card (SGC) 13 (step SS4). The signaling card 13 converts the signal message into a PSTN form of layer 2 in FIG. 8, which will be described later while referring to FIG. 8. The converted message is transmitted via the line switch 11 and the digital terminal (DT) 10 to a PCM line 30 in consonance with the V5 protocol, and thus to the access network (AN) 3 (step SS5).

According to the present invention, therefore, the calling subscriber information can be transmitted to the access network (AN) 3, regardless of what kind of subscriber terminal is connected to the access network (AN) 3.

Figure 2:
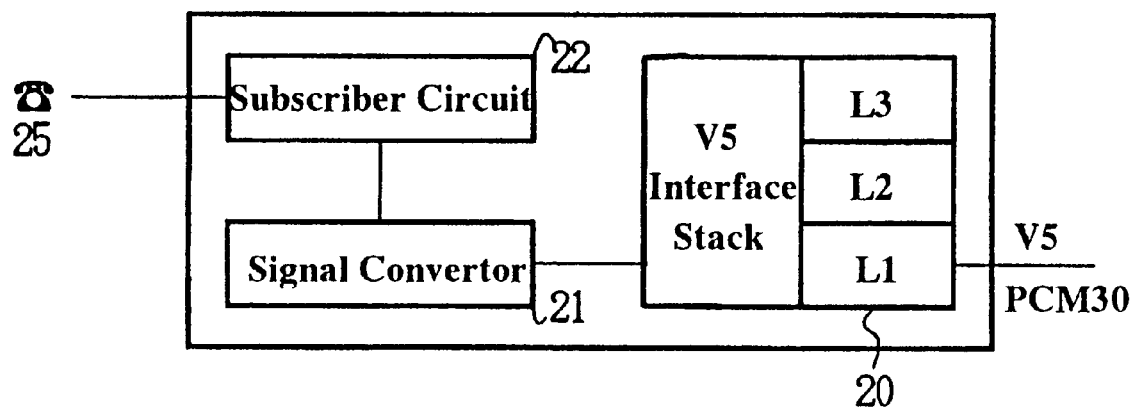
FIG. 2 is a block diagram illustrating an example arrangement of a wired subscriber terminal.
Figure 3:
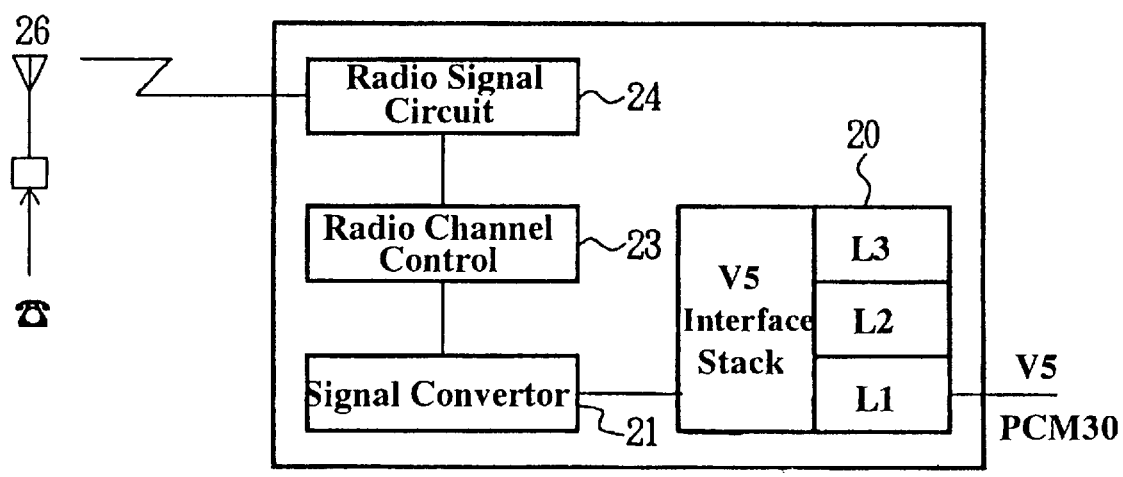
FIG. 3 is a block diagram illustrating an example arrangement of a wireless subscriber terminal.

FIGS. 2 and 3 are diagrams illustrating example configurations of the access network (AN) 3 to which a subscriber terminal is connected by wire, and of the access network (AN) 3 to which a subscriber terminal is connected by wireless. Both of the example access networks 3 include a stack 20 for processing the V5 interface protocol, and functions as interfaces for layers 1 through 3.

The access networks 3 each also have a layer 1, i.e., a signal converter 21 corresponding to a physical layer. The access network (AN) 3 in FIG. 2 is connected to a subscriber terminal 25 through a subscriber circuit 22. The access network 3 in FIG. 3 has a radio channel control 23 and a radio signal circuit 24, and is connected to a wireless subscriber terminal 26 by the setting of a radio channel and by a radio signal.

Figure 4:
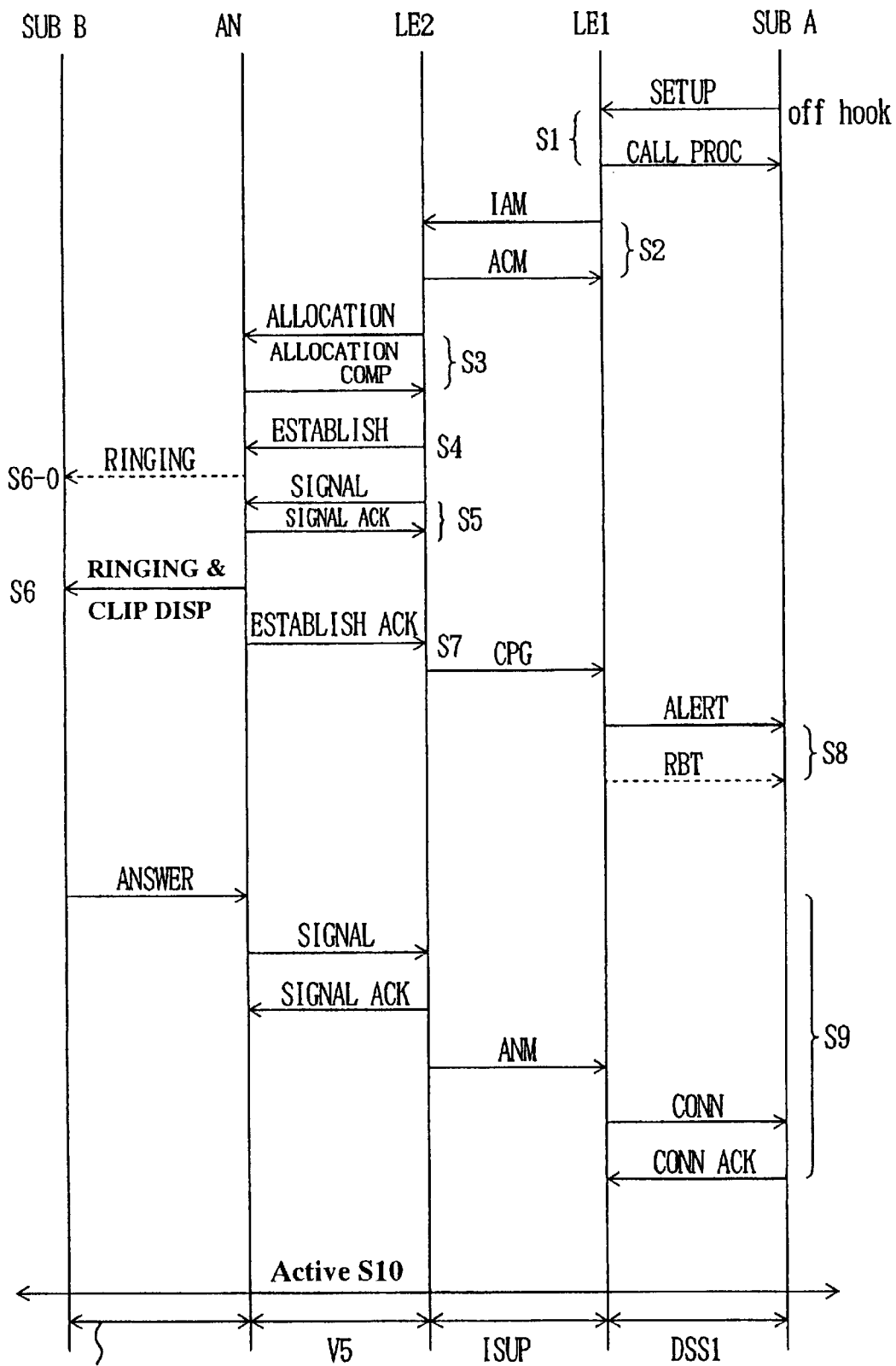
FIG. 4 is a diagram showing a process sequence according to the present invention.

With the above arrangement, the sequence of events followed by the present invention when furnishing calling subscriber information and the contents of such a notification will now be described in detail. FIG. 4 is a diagram showing the processing sequence for the present invention. In correspondence with FIG. 1, subscriber terminal A serves as a calling subscriber terminal, and subscriber terminal B serves as a called subscriber terminal.

In FIG. 4, the communication between the subscriber A (Sub A) and the local exchange 1 (LE 1) is interfaced in consonance with the protocol for digital subscriber signalling system No. 1 (DSS1), which was established by ITU-T; the communication between the local exchange 1 and the local exchange (LE 2) is interfaced in consonance with the ISUP (ISDN User Port) protocol; and the communication between the local exchange 2 and the access network 3 is interfaced in consonance with the V5 protocol. The interface between the access network 3 and the subscriber terminal B differs, depending on the type of access network 3 involved.

When the subscriber terminal A is off the hook, a setup instruction (SETUP) for a call setup is transmitted to the local exchange 1. The local exchange 1 then returns a response (CALL PROC) indicating a call is being prepared (step S1).

The local exchange 1 transmits to the local exchange 2 an address message (IAM: Initial Address Message) corresponding to the setup. Upon receipt of this message, the local exchange 2 returns an address completion message (ACM), which is an acknowledgement of the call setup received from the local exchange 1 (step S2).

The local exchange 2 transmits to the access network 3 an allocation command requesting the allocation of a speech path. When the allocation of the speech path has been accomplished, the allocation completion message is returned by the access network 3 (step S3).

When the path is set, the local exchange 2 sends a called setup request (ESTABLISH) to the access network 3 (step S4). With this arrangement of the present invention, when the called subscriber B is not a subscriber registered for a subscriber number notification service (CLIP: Calling Line Identification Presentation), ringing is transmitted immediately (step S6-0)

The subscriber management table shown in FIGS. 13A through 13C is stored in the memory (not shown) that is attached to the line processor 12 of the local exchange 2. Whether a called subscriber has been registered for a subscriber number notification service, which is an additional service, can be determined by examining the table (see FIGS. 13A through 13C).

When a called subscriber has subscribed to the subscriber number notification service, as is shown in the process sequence in FIG. 4, the immediate transmission of ringing to the subscriber terminal B is not performed. Instead, according to the present invention, the calling subscriber information is transmitted from the local exchange 2 to the access network 3 as a transmission signal and a signal ACK is sent in reply (step S6).

Ringing accompanied by the calling subscriber information is transmitted from the access network 3 to the called subscriber terminal B (step S6). Then, an acknowledgment is returned (step S7) for the called setup request (ESTABLISH) (step S4).

In response to the called setup request acknowledgment (ESTABLISH ACK), the local exchange 2 transmits a call progress message (CPG) to the local exchange 1, which in turn transmits to the subscriber terminal A a ring-back tone RBT together with an ALERT indicating alerting has been accomplished (step S8).

When a response (ANSWER) to the ringing (step S6 or step S6-0) is received from the subscriber terminal B, the access network 3 sends a signal to the local exchange 2, which then transmits an answer message (ANM) to the local exchange 1.

Thereafter, the local exchange 1 notifies the subscriber terminal A that a call connection has occurred (CONN: Connect), and the subscriber terminal A returns a call connection acknowledgment (CONN ACK) to the local exchange (step S9).

As a result, speech transmission is begun between the subscriber terminal A and the subscriber terminal B, with communication being rendered active (ACTIVE) (step S10).

Figure 5:
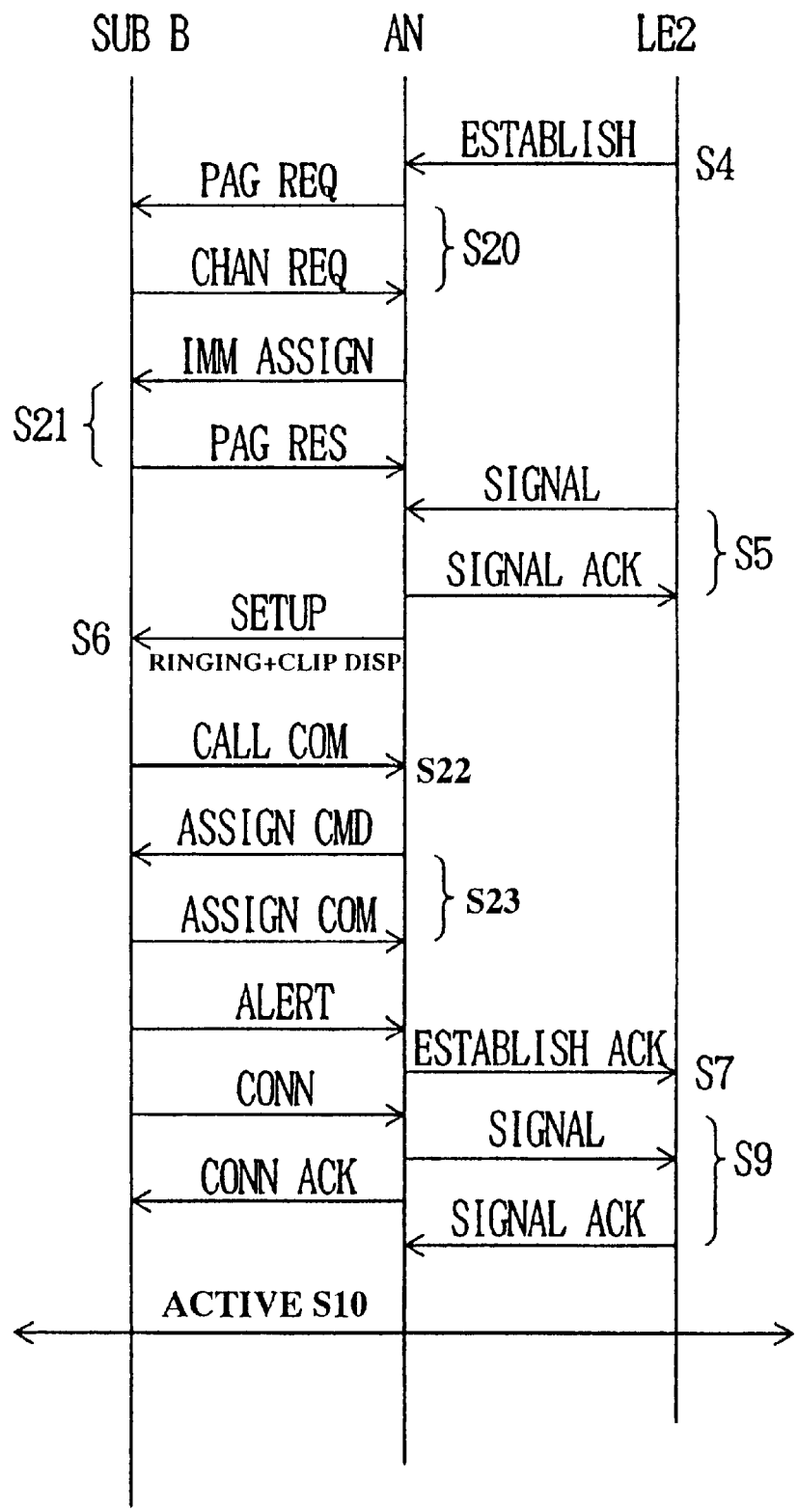
FIG. 5 is a diagram showing a process sequence between an access network and a wireless subscriber terminal according to the present invention.

The detailed processing sequence for the interaction of the access network 3 and the subscriber terminal B will be explained while referring to FIG. 5. In FIG. 5, it is assumed that the subscriber terminal B is not only a wireless subscriber terminal but is also a subscriber terminal for the calling line identification presentation service (CLIP).

The basic sequence of events occurring between the subscriber terminal A and the access network 3 is the same as that in FIG. 4. Therefore, only the sequence of events occurring between the local exchange 2 and the subscriber terminal B is shown in FIG. 5, with the same step numbers being used to denote corresponding steps in FIG. 5 as are used in FIG. 4.

When a called setup request (ESTABLISH) is received from the local exchange 2 (step S4), the access network 3 transmits to the subscriber terminal B a pager request (PAG REQ), which is a call setup request. The subscriber B transmits a control channel allocation request (CHAN REQ) to the local exchange 2 (step S20).

In response to the control channel assignment request (CHAN REQ), the local exchange 2 transmits a control channel assignment (IMM ASSIGN) to the subscriber terminal B. The subscriber terminal B then returns to the local exchange 2 (step S21) a response to the pager request.

Following this, the calling subscriber information according to the present invention is transmitted from the local exchange 2 to the access network 3 (step S5). Thereafter, the access network 3 transmits a call preparation request (SETUP) to the subscriber terminal B.

Upon receipt of this request, the subscriber terminal B performs ringing and displays the calling subscriber information (CLIP: Calling Line Identification Presentation) (step S6), and transmits a call establishment notification (CALL COMP) to the access network (step S22).

Upon receipt of the call establishment notification, the access network 3 transmits a channel assignment command (ASSIGN CMD) to the subscriber terminal B, and the subscriber terminal B replies with a channel assignment completion message (ASSIGN COM) to the access network 3 (step S23). Thereafter, an alerting display (ALERT) is sent to the access network 3. Then, an acknowledgment (ESTABLISH ACK) of the called setup request (ESTABLISH) is transmitted to the local exchange (step S7).

Subsequently, the subscriber terminal B transmits a connection notification (CONN) to the access network 3, and the access network replies with a connection notification acknowledgment (CONN ACK) (step S9). Upon the receipt of this acknowledgment, the transmission of SIGNAL and the return transmission of SIGNAL ACK are performed between the access network 3 and the local exchange 2. As a result, the transmission of speech is begun and communication is rendered active (ACTIVE) (step S10).

Figure 6:
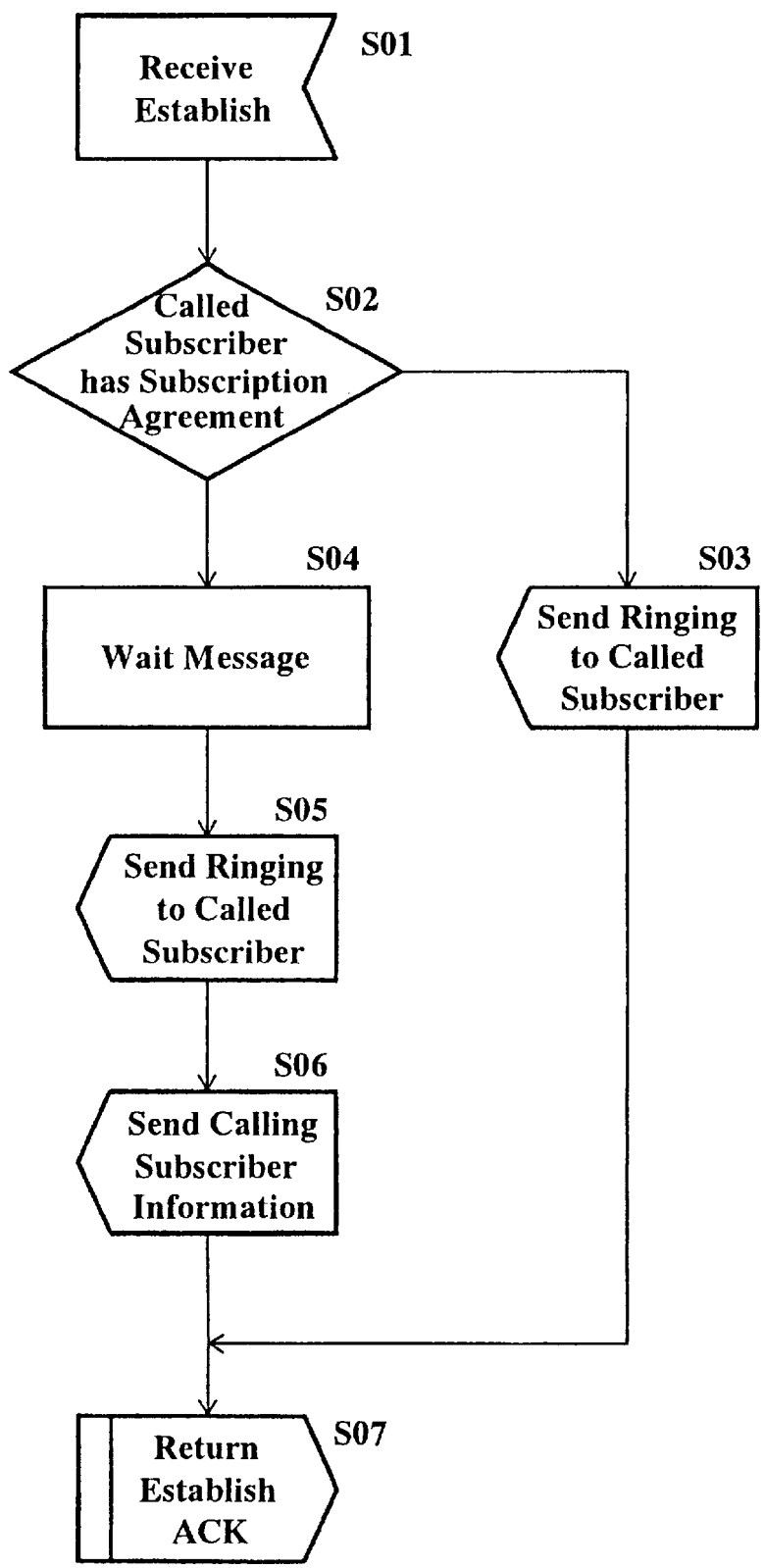
FIG. 6 is a flowchart showing the operation of the access network.

In FIG. 6 is a flowchart showing the feature of the present invention as it is applied for the operation of the access network 3 in FIG. 4, in which the called setup request (ESTABLISH) is received from the local exchange 2 and the called setup request acknowledgment (ESTABLISH ACK) sent in reply.

In FIG. 6, when the access network 3 has received the called request (ESTABLISH) (step S01), it determines whether the called subscriber is a subscriber registered for the calling line identification presentation service (CLIP) (step S02). As was previously described, the subscriber management tables in FIGS. 13A through 13C are examined to determine whether or not the called subscriber is a subscriber registered for the calling line identification presentation service (CLIP).

If the called subscriber is not a subscriber registered for the calling line identification presentation service (CLIP), ringing is transmitted immediately to the called subscriber (step S03: see step S6-0 in FIG. 4).

If the called subscriber is a subscriber registered for the calling line identification presentation service (CLIP), the program control waits until a signal message, i.e., the calling subscriber information, is received from the local exchange 2 (step S04: see step S5 in FIG. 4). Then, ringing is transmitted to the called subscriber (step S05), and the calling subscriber information is sent to the called subscriber (step S06: see step S6 in FIG. 4).

The called setup request acknowledgment (ESTABLISH ACK) is sent in reply to the local exchange 2 (step S07). As is described above, in the present invention, upon receipt of a call request, immediate transmission of the ringing is not performed for a called subscriber who is a subscriber for the CLIP.

Figure 7:
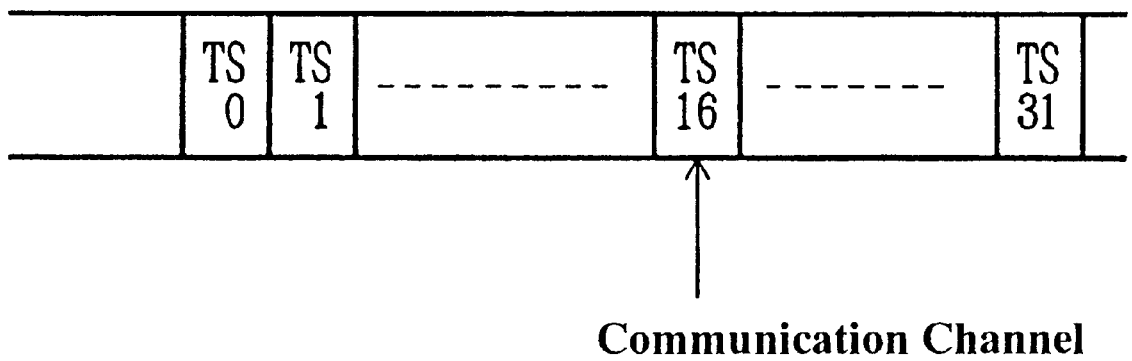
FIG. 7 is a diagram showing a signal format for a PCM that is transmitted to a transfer path.

In FIG. 7 is shown the signal format for the PCM 30 that is transmitted to the transfer path connecting the local exchange 2 and the access network 3. The signal format has a multi-frame structure in which are provided time slots TS0 to TS31. Time slot TS16 is a communication channel, and the 30 time slots aside from TS0 are bearer channels.

Further, the local exchange 2 and the access network 3 support the V5 interface, and control information in consonance with PSTN (Public Switched Telephone Network) protocol, BCC protocol, LINK protocol, PROTECTION (spare) protocol and ISDN-D channel protocol is carried in the time slot T16. The sequence of events previously described while referring to FIGS. 4 and 5 is performed in consonance with these protocols.

Figure 8:
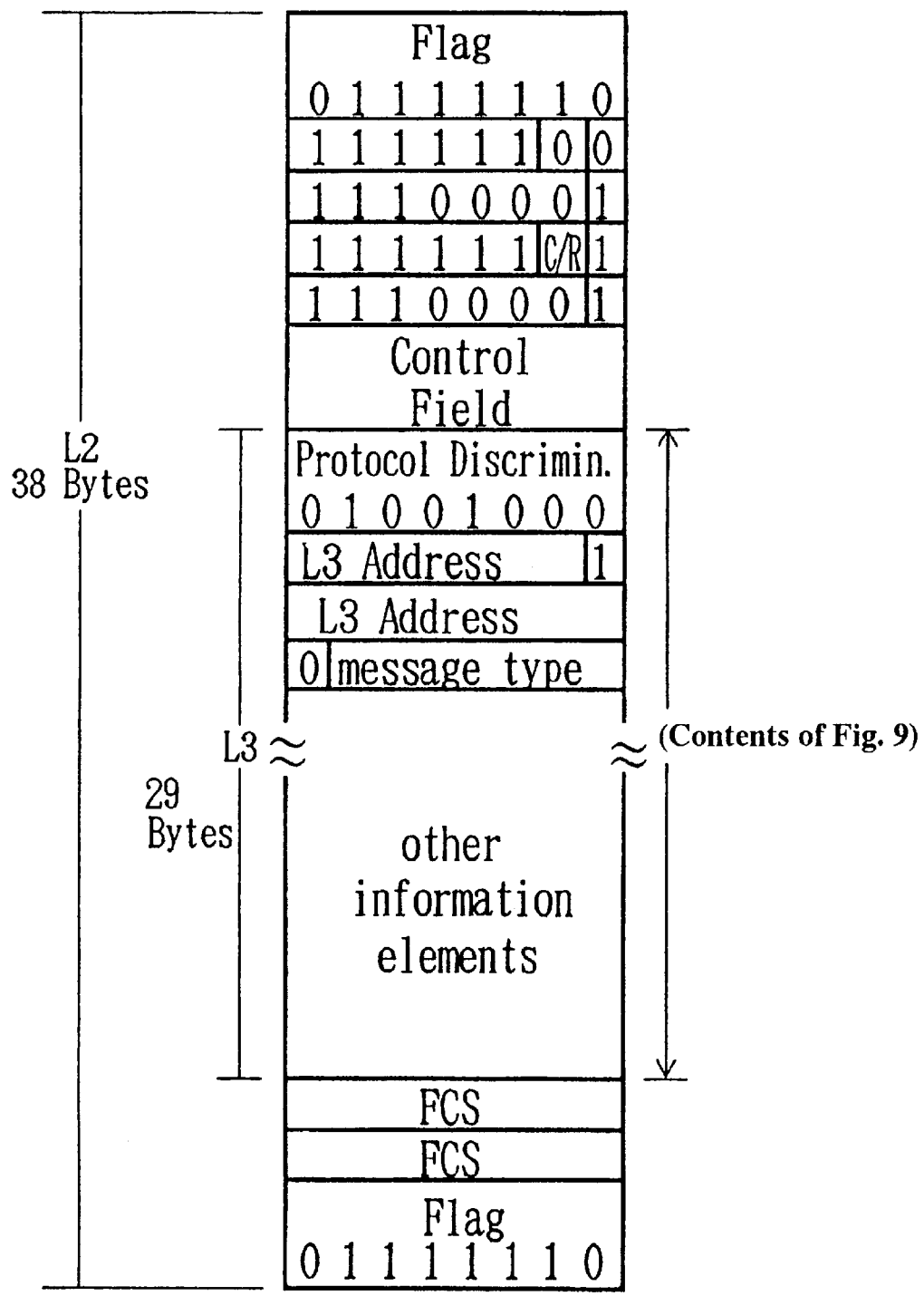
FIG. 8 is a diagram showing an information format for a PSTN protocol corresponding to a V5 interface.

In FIG. 8 is shown an information format for the PSTM protocol. The PSTN protocol is the protocol, in LAYER 2, that supports the V5 interface, for the transfer of information across the transfer path for the PCM 30 in FIG. 7, that connects the local exchange 2 and the access network 3. Of 38 bytes, 29 bytes serve as a format area L3 for LAYER 3 of the present invention. The details are shown in FIG. 9.

Figure 9:
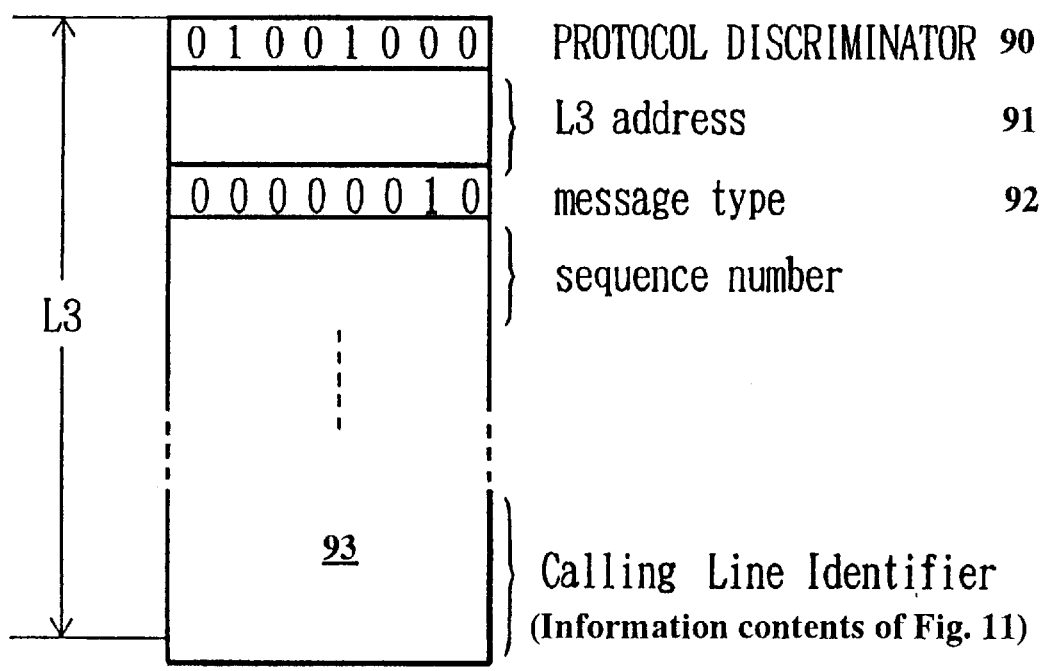
FIG. 9 is a diagram showing the format structure of L3 in FIG. 8.

As is shown in FIG. 9, a protocol discriminator 90, an address 91, a message type 92 and an information element 93 are arranged in order in LAYER 3. Protocol types 101 for the LAYER 3, corresponding message types 102, and message usages 103 are shown in FIG. 10. The protocol discriminator 90 is defined for the individual protocol types 101, and the message types 92 are defined for the individual message types 102.

In addition, a CLI (Calling Line Identifier) information format that is specified in consonance with the present invention is carried in the information element 93. FIG. 11 is a detailed diagram showing a CLI information format, and FIG. 12 is a diagram showing example contents of the CLI information format. CLI information identification code [01111111] is entered in the first octet in the CLI information format.

The second octet indicates the length of the CLI information; the third octet, the month in which information is produced; the fourth octet, a date on which information is produced; and the fifth and the sixth octets, time at which information is produced.

The seventh octet to the (m−1)th octet indicate a dial number for a calling subscriber terminal. In an example shown in FIG. 12, a length equivalent to five octets is used to hold the phone number [0447524051].

The m-th octet to the n-th octet hold the name of a calling subscriber terminal. In the example in FIG. 12, a length equivalent to nine octets is used to hold the name of a calling subscriber, [OGASAWARA].

FIGS. 13A through 13C are diagrams for explaining the contents of a subscriber management table that is prepared for each of the subscriber terminals that are stored in a memory (not shown) of the previously mentioned line processor 12. In FIG. 13A, location address I, subscriber number II, and data III, for indicating whether a subscriber is one for whom optional services should be provided, are recorded.

Therefore, whether a subscriber has been registered for a calling line identification presentation service (CLIP) can be determined by referring to the data III in FIG. 13A, which indicate which optional services are available for the subscriber.

The details for location address I are shown in FIG. 13B. Subscriber terminal type IV and physical address V, such as a shelf number, are recorded in the location address I. An example entry for the subscriber terminal type IV is shown in FIG. 13C. The subscriber terminal types are displayed as 000 (analog terminal), 001 (ISDN terminal), 010 (wired terminal) or 011 (wireless terminal).

Thus, the information concerning type IV can be referred to in order to determine whether subscriber terminal B, which is connected to the access network 3, is an analog terminal or an ISDN terminal, and whether the access network 3 and the subscriber terminal B are connected by wire or by wireless.

Figure 14:
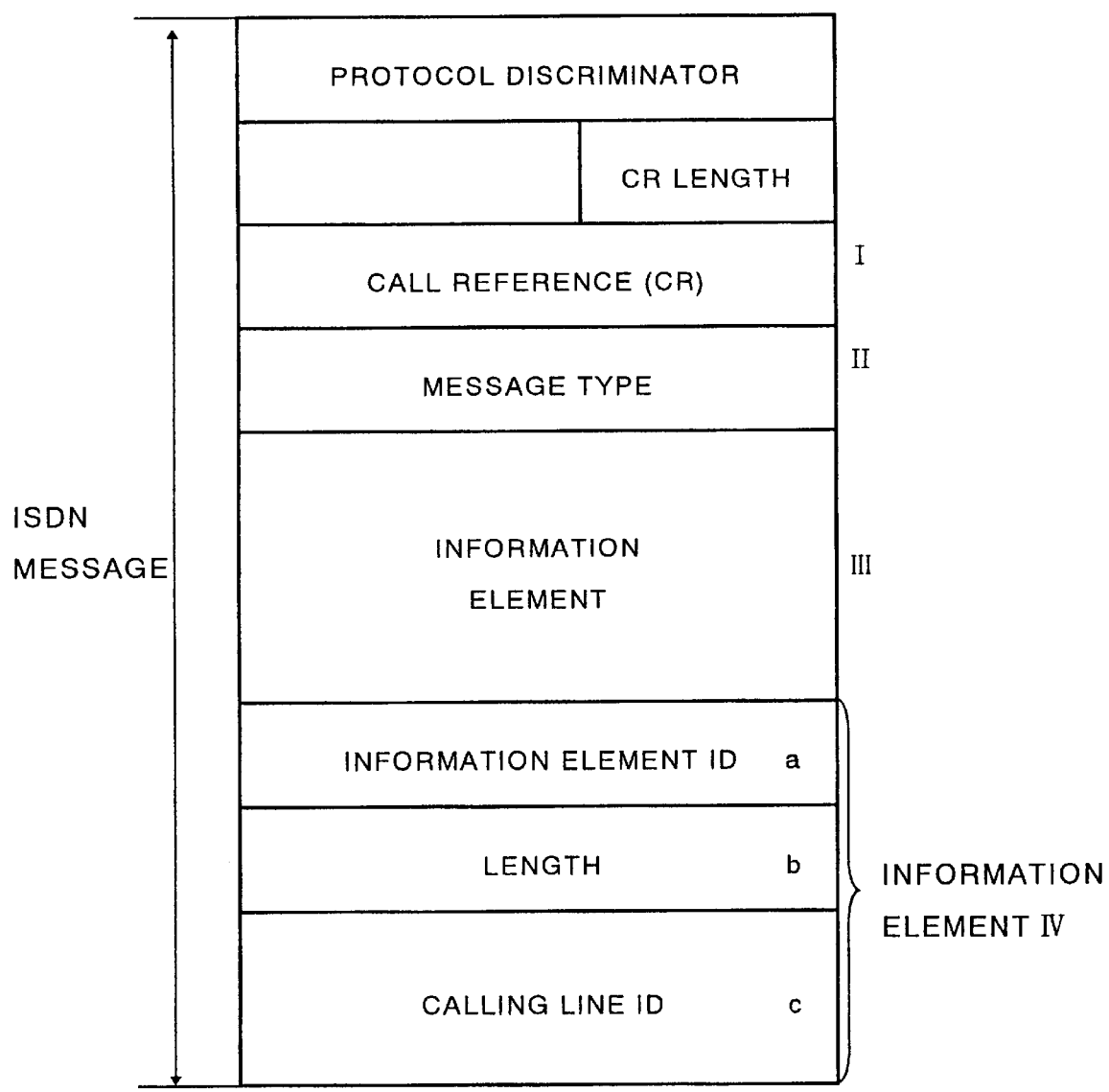
FIG. 14 is a diagram showing a format used for transmitting calling subscriber information across the ISDN.

In FIG. 14 is shown a format for LAYER 3 for the transmission of subscriber information when the subscriber terminal is an ISDN terminal. This format corresponds to that shown in FIG. 9. In FIG. 14, the entry CR (Call Reference) I represents a call identification signal sent to a subscriber terminal. The entry Message type II represents, for example, a SETUP (call setup) number, and in information element III is entered a notification of a calling subscriber number.

Also, a calling subscriber number is recorded in information element IV. The contents of the information element IV corresponds to those of the CLI information format in FIG. 11. An identification code for furnishing a calling subscriber number is added in column a of the information element IV, the length of information is entered in column b, and the actual number of a calling subscriber is recorded in column c.

In FIG. 15 are shown example messages used when the access network 3 transmits calling subscriber information to a wireless subscriber terminal. These messages reflect a call setup that conforms to GSM standards for European 800 MHz digital portable telephones. Calling subscriber number a and called subscriber number b are included.

As is described above, according to the present invention, information to be sent to a called subscriber is constituted basically by the length of information and the contents of the information, as is shown in FIG. 11. The information can be expanded as desired. What information should be transmitted to a user depends on the capability of a called subscriber terminal, and information received by a local exchange can be shared regardless of the form of an access network. Therefore, the capability of a called subscriber is not designated.

Further, according to the present invention, since the format has a message structure, not only a calling subscriber number, but also information concerning the date and the time, and the phone number and the name of a calling subscriber can be transmitted to a called subscriber, as is described above.

The above embodiment, with the drawings, has been employed as an example to describe the present invention, but the present invention is not limited to that has been disclosed. The scope of the present invention is as defined in the claims, and the scope of the coverage afforded by the present invention corresponds to the scope of the claims.

What is claimed is:

1. A calling subscriber information notification system, comprising:

a local exchange for generating a signal message including information concerning a calling subscriber terminal; and an access network, located independent of said local exchange, for accommodating a plurality of subscriber terminals, and when a called subscriber has been registered for a called number notification service, sending the signal message sent from said local exchange to the called subscriber;

wherein said local exchange has an interface for call control, which is performed by a protocol set on a control channel provided together with a communication channel on a PCM transfer path and is connected to said access network across the PCM transfer path.

2. The calling subscriber information notification system according to claim 1, wherein said information concerning said subscriber information terminal includes the phone number and the name of said calling subscriber.

3. A calling subscriber information notification system, comprising:

a local exchange for generating a signal message including information concerning a calling subscriber terminal; and an access network, located independent of said local exchange, for accommodating a plurality of subscriber terminals, and when a called subscriber has been registered for a called number notification service, sending the signal message sent from said local exchange to the called subscriber;

wherein a format for said information concerning said calling subscriber terminal that is transmitted from said local exchange to said access network is constituted in consonance with a public switched telephone network protocol, and wherein as parts of said format are included an identification code for said information, a length of said information, and said information.

4. The calling subscriber information notification system according to claim 3, wherein said information includes at least a phone number of a calling subscriber.

5. A calling subscriber information notification system comprising:

a local exchange for generating a signal message including information concerning a calling subscriber terminal; and access network, located independent of said local exchange, for accommodating a plurality of subscriber terminals, and when a called subscriber has been registered for a called number notification service, sending the signal message sent from said local exchange to the called subscriber;

wherein said local exchange has a subscriber management table wherein are entered data indicating whether or not a called subscriber has been registered for a called number notification service, and information indicating whether a called subscriber is an analog terminal or an ISDN terminal, and whether the called subscriber is connected to said access network by wire or by wireless.

6. The calling subscriber information notification system according to claim 5, wherein said local exchange transmits a called setup request to said access network, and wherein, when a called subscriber has been registered for a called number notification service, said access network that has received said called request does not immediately perform ringing, but waits to receive a signal message, from said local exchange, included in which is calling subscriber information, and then performs ringing.

7. The calling subscriber information notification system according to claim 5, wherein when said called subscriber is a terminal connected to said access network by wireless, the message including calling subscriber information to be transmitted by said access network to a wireless subscriber terminal conforms to a standard corresponding to wireless communication method.

* * * * *